US012467293B2

(12) United States Patent
Reich et al.

(10) Patent No.: US 12,467,293 B2
(45) Date of Patent: Nov. 11, 2025

(54) FITTING ARRANGEMENT FOR A WINDOW OR DOOR

(71) Applicant: Roto Frank Fenster- und Tuertechnologie Gmbh, Leinfelden-Echterdingen (DE)

(72) Inventors: Winfried Reich, Berglen (DE); Tamas Nyikos, Sopron (HU); Martin Krebs, St. Johann (DE); Choongeun Park, Stuttgart (DE)

(73) Assignee: Roto Frank Fenster- und Tuertechnologie Gmbh, Leinfelden-Echterdingen (DE)

(*) Notice: Subject to any disclaimer, the term of this patent is extended or adjusted under 35 U.S.C. 154(b) by 218 days.

(21) Appl. No.: 18/359,860

(22) Filed: Jul. 26, 2023

(65) Prior Publication Data

US 2023/0366251 A1 Nov. 16, 2023

Related U.S. Application Data

(63) Continuation of application No. PCT/EP2022/052485, filed on Feb. 2, 2022.

(30) Foreign Application Priority Data

Feb. 26, 2021 (DE) ..................... 10 2021 201 882.3

(51) Int. Cl.

| | |
|---|---|
| ***E05C 9/00*** | (2006.01) |
| ***E05C 9/18*** | (2006.01) |
| ***E05D 15/06*** | (2006.01) |

(52) U.S. Cl.

CPC ........ *E05C 9/1858* (2013.01); *E05D 15/0621* (2013.01); *E05Y 2900/132* (2013.01); *E05Y 2900/148* (2013.01)

(58) Field of Classification Search

CPC ............... E05B 65/0864; E05B 65/087; E05B 65/0876; E05B 65/08; E05B 65/0823;

(Continued)

(56) References Cited

U.S. PATENT DOCUMENTS

| | | |
|---|---|---|
| 1,069,451 A | 8/1913 | Marston |
| 6,514,024 B2 | 2/2003 | Akema et al. |

(Continued)

FOREIGN PATENT DOCUMENTS

| | | |
|---|---|---|
| CN | 205 669 368 U | 11/2016 |
| DE | 22 00 709 A | 7/1973 |

(Continued)

OTHER PUBLICATIONS

Grote et al., "Dubbel Taschenbuch fuer den Maschinenbau", 22. Auflage, Springer, Heidlberg, 2007, 4 pages.

(Continued)

*Primary Examiner* — Chi Q Nguyen

(74) *Attorney, Agent, or Firm* — Orbit IP, LLP; Marc G. Martino

(57) ABSTRACT

A fitting arrangement for a window or a door has a drive bar with a through-hole. A control pin and/or a counter element of the fitting arrangement is/are passed through the through-hole and connected to one another such that the control pin is captively retained on the drive bar. The control pin is preferably connected to the counter element without the use of tools. Particularly preferably, a spring element is provided which latches the control pin by pressing the control pin and the counter element axially together. The spring element can be designed in the form of a circlip which, in the not yet assembled state, is arranged on the control pin or the counter element.

18 Claims, 14 Drawing Sheets

(58) Field of Classification Search
CPC ........ E05D 15/1013; E05D 2015/1026; E05D 15/0621; E05C 9/025; E05C 9/042; E05C 9/1858; E05Y 2201/22; E05Y 2201/23; E05Y 2900/132; E05Y 2900/148
See application file for complete search history.

(56) References Cited

U.S. PATENT DOCUMENTS

| | | | | |
|---|---|---|---|---|
| 8,915,020 | B2 * | 12/2014 | Sauter | E06B 7/2318 187/400 |
| 9,169,672 | B1 * | 10/2015 | Kislov | E06B 9/02 |
| 10,077,594 | B2 * | 9/2018 | Fingerle | E05D 15/10 |
| 10,180,015 | B1 * | 1/2019 | Grainger | E05D 15/22 |
| 11,002,065 | B2 * | 5/2021 | Balbach | E06B 7/2316 |
| 11,085,216 | B2 * | 8/2021 | Reich | E05D 15/10 |
| 11,118,385 | B2 * | 9/2021 | Hawkinson | E05F 5/003 |
| 11,428,033 | B2 * | 8/2022 | Beutel | E05D 15/0665 |
| 2004/0163317 | A1 * | 8/2004 | Reich | E05D 15/565 49/226 |
| 2005/0008456 | A1 | 1/2005 | Birkelbach et al. | |
| 2005/0028946 | A1 * | 2/2005 | Weishar | E05F 15/643 160/214 |
| 2010/0154174 | A1 * | 6/2010 | Haab | E05F 15/605 49/358 |
| 2014/0246157 | A1 * | 9/2014 | Letonje | E06B 9/58 160/188 |
| 2019/0292828 | A1 * | 9/2019 | Liu | E05B 3/00 |

FOREIGN PATENT DOCUMENTS

| | | | |
|---|---|---|---|
| DE | 22 59 891 | A | 6/1974 |
| DE | 27 05 802 | A1 | 8/1978 |
| DE | 30 41 511 | A1 | 5/1982 |
| DE | 202 01 319 | U1 | 6/2002 |
| DE | 10 2009 006 390 | A1 | 2/2010 |
| DE | 10 2016 004 917 | A1 | 10/2017 |
| DE | 10 2018 116 417 | A1 | 1/2020 |
| EP | 0 104 126 | A1 | 3/1984 |
| EP | 1 072 745 | A1 | 1/2001 |
| EP | 1 975 353 | A1 | 10/2008 |
| EP | 3 555 397 | B1 | 11/2020 |
| GB | 2 280 708 | A | 2/1995 |
| GB | 2 476 486 | A | 6/2011 |
| GB | 2 584 332 | A | 12/2020 |
| GB | 2 584 333 | A | 12/2020 |
| WO | 2012/166552 | A1 | 12/2012 |

OTHER PUBLICATIONS

Wikipedia, "Passfeder", Available online at :—"https://de.wikipedia.org/w/index.php?title=Passfeder&stableid=195590087", Retrieved on Jul. 12, 2023, 3 pages.
Wikipedia, "Passung", Available online at :—"https://de.wikipedia.org/w/index.php?title=Passung&stableid=203873792", Retrieved on Jul. 12, 2023, 9 pages.
Wikipedia, "Sprengring", Available online at :—"https://de.wikipedia.org/w/index.php?title=Sprengring&stableid=198174989", Retrieved on Jul. 12, 2023, 4 pages.

* cited by examiner

FITTING ARRANGEMENT FOR A WINDOW OR DOOR

CROSS-REFERENCE TO RELATED APPLICATIONS

This continuation application claims priority to PCT/EP2022/052485 filed on Feb. 2, 2022 which has published as WO 2022/179815 A1 and also the German application number 10 2021 201 882.3 filed on Feb. 26, 2021, the entire contents of which are fully incorporated herein with these references

DESCRIPTION

Field of the Invention

The invention relates to a fitting arrangement for a window or a door. The invention further relates to a window or a door having such a fitting arrangement and to a method for mounting a fitting arrangement.

Background of the Invention

Window and doors, in particular, with aluminum profiles, are usually equipped with so-called drive bars which, as a component of the central lock, perform a linear stroke movement in correlation with the rotational movement of a handle. Through-holes are produced at certain positions of the drive bar, through which through-holes a control pin can be inserted from the rear side of the drive bar (the side closer to the glass) to the stop. The control pin on the drive bar can fulfill certain functions, for example, as a closing point.

Since the diameter of the through-hole of the drive bar is often standardized and the width of the drive bar is limited, the diameter of the through-hole cannot become arbitrarily large. Nevertheless, the outer diameter of the control pin to be inserted must be smaller than the diameter of the through-hole. The problem, in particular, with control pins provided with a bearing, is that the outer diameter of the bearing exceeds the diameter of the through-hole, and the control pin thus cannot simply be inserted from one side into the through-hole. However, the use of a bearing-supported control pin is desirable, in particular, in the case of high leaf weights. There is therefore a need to provide an easily mountable control pin.

DE 10 2018 116 417 A1 discloses a pre-assembled fitting group for a window or a door. Parts of the fitting group are riveted. The fitting group has a control projection that is arranged or formed on a drive bar.

CN 205669368 U and US 2019/0292828 A1 disclose a fitting arrangement with a force receiving portion on which a driving shaft is arranged.

A displacement arrangement with a drive bar and at least one control projection arranged on the drive bar has become known from generic EP 3 555 397 Bl. The control projection can be held on the drive bar with a screw connection.

SUMMARY OF THE INVENTION

Object of the Invention

In contrast, the object of the invention is to provide a fitting arrangement with an easily mountable control pin. It is a further object of the invention to provide a window or a door with such a fitting arrangement and a method for mounting a fitting arrangement.

DESCRIPTION OF THE INVENTION

This object is achieved according to the invention by a fitting arrangement according to claim 1, a window or a door according to claim 14 and a method according to claim 15. The dependent claims reflect preferred embodiments.

The object according to the invention is thus achieved by a fitting arrangement having a drive bar, which has a through-hole, and a control pin which is arranged at the through-hole and is secured with a counter element, wherein the counter element can be mounted on the control pin without the use of tools, can be mounted on the control pin by means of a, in particular axial, frictional connection and/or can be engaged from behind by a slot nut.

The fitting arrangement can be mounted significantly more easily than known fitting arrangements and nevertheless ensures a secure or reliable connection of the control pin to the drive bar. The control pin is preferably held on the counter element in a rivet-free manner.

The control pin may be designed to have multiple parts. Preferably, the control pin is formed in one piece (monolithically).

The control pin may be axially arranged on the drive bar free of play. Alternatively, axial play may be present.

The slot nut may be T-shaped. The slot nut may have a bore with a thread, in particular, in the form of an internal thread, with which a thread, in particular in the form of an external thread, of the control pin engages, in order to clamp the slot nut by rotating the control pin after the stops.

The fitting arrangement may have a guide roller for guiding the control pin in a guide slot and/or a control roller for guiding the control pin in a control slot. The guide roller and/or the control roller may be arranged on the control pin so as to be guided by bearings, and in particular guided by rolling bearings. Preferably, the control roller is formed integrally with the control pin. The control pin equipped with a bearing has a particularly positive effect on the operating torque, since friction is significantly reduced by the control pin. The reduced operating torque at the window handle ensures comfortable operation of the window or door and thus leads to increased customer satisfaction.

Preferably, the counter element is arranged on the control pin such that it cannot be released in a non-destructive manner. This ensures a particularly secure connection of the control pin to the drive bar.

The counter element may be mounted in a form-fitting manner on the control pin in order to provide a particularly secure connection.

In a further preferred embodiment of the invention, a spring element is provided which is arranged between the control pin and the counter element, and in the assembled state engages in the control pin and the counter element. The spring element preferably engages with a groove of the control pin and/or a groove of the counter element.

The control pin and/or the counter element may have a lead-in chamfer so that the spring element is widened or pressed together when the counter element is mounted on the control pin.

The fitting arrangement may be formed in a structurally particularly simple manner if the spring element is designed in the form of an open spring ring ("circlip").

Mounting is further simplified if the control pin can be passed through the through-hole together with the counter element. After having been passed through, the counter element may be adapted to be widened in order to engage behind the drive bar. A latching means may be provided on the control pin and/or on the counter element in order to latch the counter element in the widened assembled state. Alternatively or additionally, the control pin and/or the counter element may have a chamfer for widening the counter element during assembly.

A groove for latching the latching means in the non-widened state of the counter element may be provided on the control pin. Alternatively or additionally, a groove for latching the latching means in the non-widened state of the counter element may be provided on the control pin.

The counter element is preferably designed in the form of a cap which is radially expandable by an axial movement relative to the control pin during assembly.

In a further embodiment of the invention, the counter element is displaceable, in particular, in the longitudinal direction of the drive bar, and in the assembled state engages with the control pin, in particular in a securing groove of the control pin. The counter element may be U-shaped and in the assembled state engage behind an, in particular, circumferential, securing groove of the control pin.

In a further embodiment of the invention, the control pin may be held on the counter element by a press fit. The control pin can be partially inserted into the counter element.

Alternatively or additionally, the fitting arrangement may have a round billet which is inserted into the control pin and engages behind the counter element. The round billet may be designed to be mushroom-shaped.

The control pin and/or the counter element may have a retaining claw to prevent the counter element from being pulled off the control pin in the assembled state of the counter element. The retaining claw may be designed such that, in case of an attempt to axially pull the counter element off the control pin, it locks in order to prevent the counter element from being pulled off. The retaining claw may be part of a lock washer which is arranged or formed in the counter element. When the control pin is mounted, the lock washer can be widened at least in part.

The fitting arrangement may furthermore have a carriage into which the control pin projects. The carriage may have a roller part with at least one running roller, in particular, with two running rollers, a fastening part with a guide slot, and a control link in the roller part which extends at least in sections obliquely to the guide slot.

A fitting arrangement with the following feature combination forms an independent aspect of the invention:

a) a drive bar;

b) a control pin arranged or formed on the drive bar; c) a carriage having c1) a roller part with at least one running roller and one control slot;

c2) a fastening part with a guide slot, wherein the fastening part is designed to fasten the carriage to a leaf of the window or door;

d) a guide roller arranged on the control pin, which guide roller is guided in the guide slot;

e) a control roller guided in the control slot, wherein the control roller is integrally formed with the control pin.

The above feature combination may be combined with one or more features described herein.

The object according to the invention is further achieved by a window or a door with a fixed frame and a leaf, wherein a fitting arrangement described herein is mounted on the leaf.

Preferably, the leaf and/or the fixed frame has a profile made of aluminum. The use of a fitting arrangement described herein is particularly advantageous in case of an “aluminum window” or an “aluminum door.”

The object according to the invention is further achieved by a method for mounting a fitting arrangement, in particular a fitting arrangement described herein, comprising the method steps of:

Guiding a control pin through a through-hole of the drive bar;

Securing the control pin by a counter element; wherein the control pin is mounted on the counter element without the use of tools;

the counter element is mounted on the control pin by means of a, in particular axial, frictional connection; and/or a slot nut arranged on the control pin is pivoted until the slot nut abuts against a stop in the counter element.

Further advantages of the invention can be found in the description and the drawings. Likewise, according to the invention, the aforementioned features and those which are to be explained below can each be used individually or together in any desired combination. The embodiments shown and described are not to be understood as an exhaustive list, but, rather, have an exemplary character for the description of the invention.

DETAILED DESCRIPTION OF EMBODIMENTS OF THE INVENTION

Figure 1A:
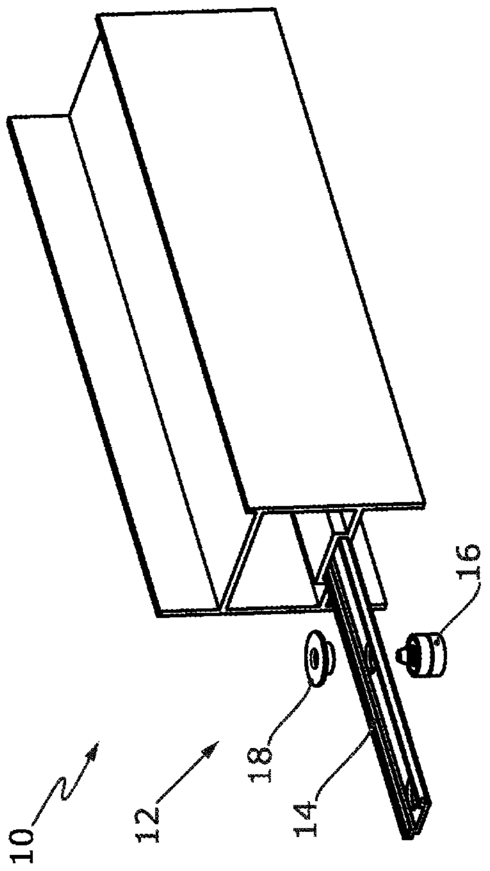
FIG. 1*a* shows an isometric view of a fitting arrangement with a control pin and a counter element before assembly.

FIG. 1*a* shows a part of a door 10 with a fitting arrangement 12. The fitting arrangement 12 comprises a drive bar 14. A control pin 16 with a counter element 18 can be fastened to the drive bar 14.

Figure 1B:
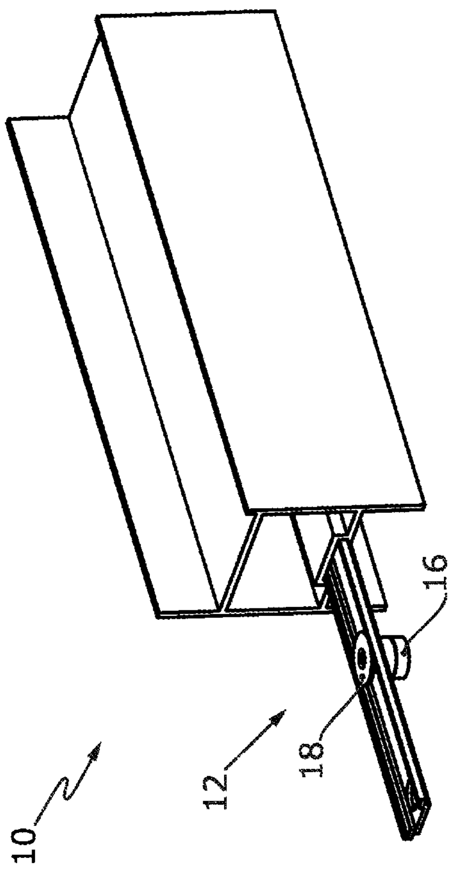
FIG. 1*b* shows an isometric view of the fitting arrangement of FIG. 1*a* after assembly.
Figure 1E:
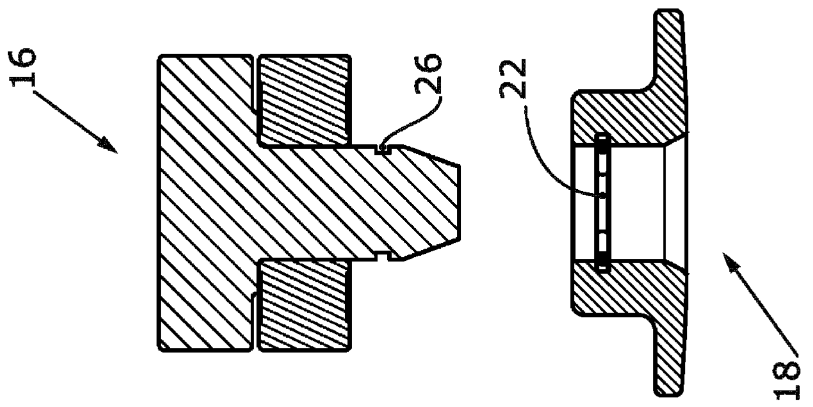
FIG. 1*e* is a sectional view of the control pin and the counter element of FIG. 1*d*.
Figure 1D:
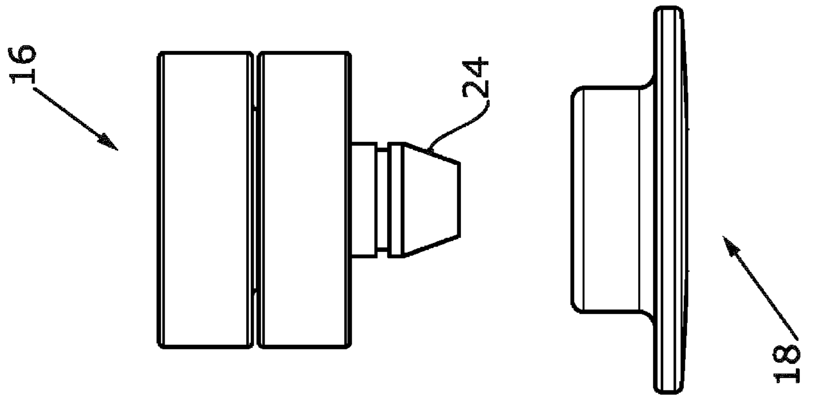
FIG. 1*d* shows a side view of the control pin and the counter element of FIG. 1*c*.
Figure 1C:
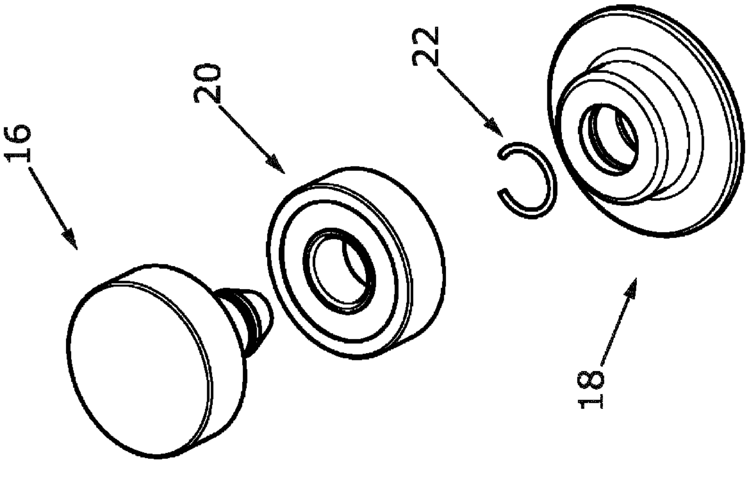
FIG. 1*c* shows an exploded view of the control pin and the counter element of FIG. 1*a*. The counter element is fastened with a spring ring on the counter element.
Figure 1G:
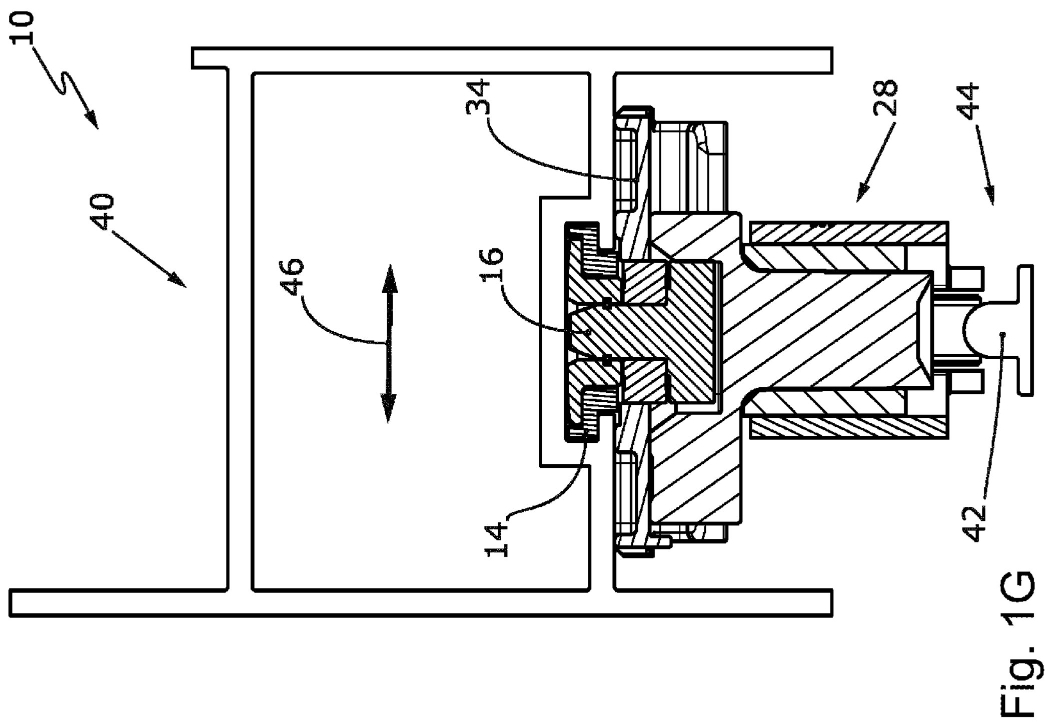
FIG. 1*g* shows a sectional view of the fitting arrangement of FIG. 1*e* with the carriage of FIG. 1*f*.
Figure 1F:
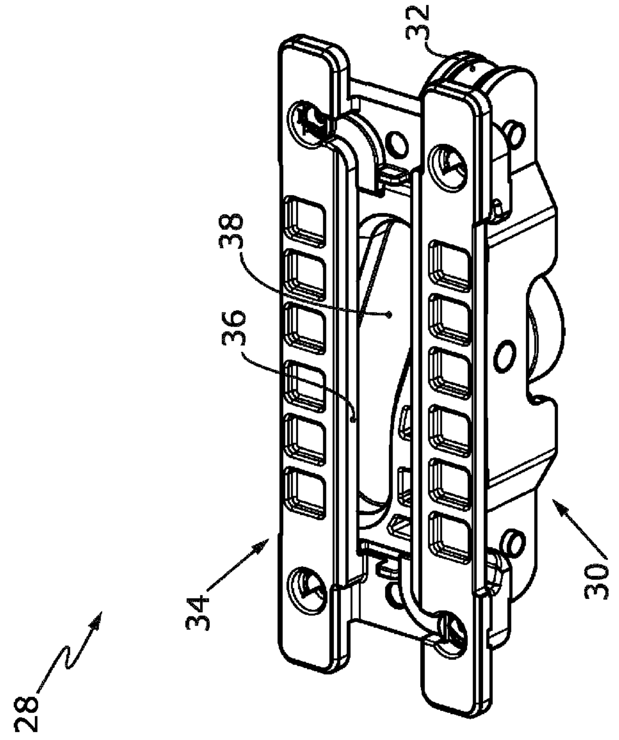
FIG. 1*f* shows an isometric view of a carriage.

The control pin 16 serves to control a carriage 28 (see FIGS. 1*f* and 1*g*). According to the invention, the control pin 16 can be fastened to the drive bar 14 in a particularly simple manner. Particularly preferred variants for fastening the control pin 16 are described below.

FIG. 1*b* shows the door 10 with the fitting arrangement 12 in the assembled state. The control pin 16 and the counter element 18 were pressed together for assembly.

FIG. 1*c* shows an exploded view of the control pin 16 and the counter element 18. It can be seen from FIG. 1*c* that a guide roller 20 is arranged on the control pin 16. A spring element 22 is provided to secure the control pin 16 to the counter element 18.

FIG. 1*d* shows the arrangement of the control pin 16 and the counter element 18 before assembly. The control pin has a lead-in chamfer 24 for simple insertion of the control pin 16 into the counter element 18.

FIG. 1*e* shows a sectional view of the arrangement of control pin 16 and counter element 18 before assembly. It can be seen from FIG. 1*e* that the spring element 22 is embedded in the counter element 18 and can be penetrated by the control pin 16. When the spring element 22 is penetrated, the spring element 22 is widened and then locks in a groove 26 of the control pin 16 in particular such that it cannot be released in a non-destructive manner.

FIG. 1*f* shows a carriage 28 for receiving a control pin 16 (see FIG. 1*g*). The carriage 28 comprises a roller part 30 with at least one running roller 32. The carriage 28 furthermore has a fastening part 34 with a guide slot 36. The guide slot 36 is designed in the form of an elongated through-slot. The roller part 30 has a control slot 38 extending at least in sections obliquely to the guide slot 36. The control slot 38 is designed in the form of an elongated blind slot (or pocket).

FIG. 1*g* shows the door 10 with a leaf 40. The carriage 28 is mounted on the fastening part 34 on the leaf 40. The carriage 28 can be moved on a running rail 42 of a fixed frame 44. The control pin 16 projects both into the guide slot 36 (see FIG. 1*f*) and into the control slot 38 (see FIG. 1*f*). A movement of the control pin 16 in the longitudinal direction of the drive bar 14 causes a transverse movement of the leaf 40 (see arrow 46) relative to the longitudinal direction of the running rail 42.

Figure 2B:
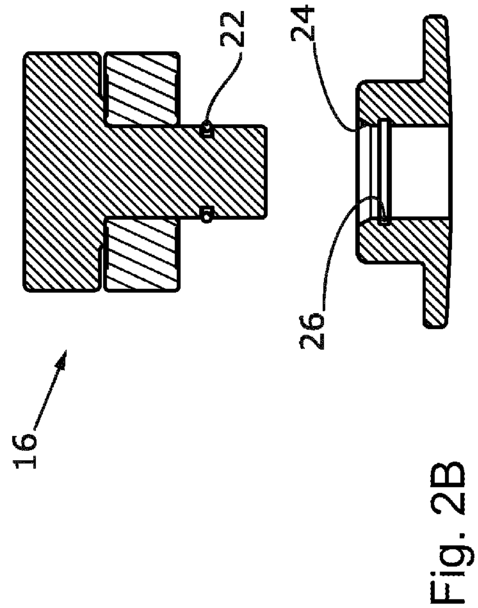
FIG. 2*b* shows a sectional view of the control pin and the counter element of FIG. 2*a*.
Figure 2A:
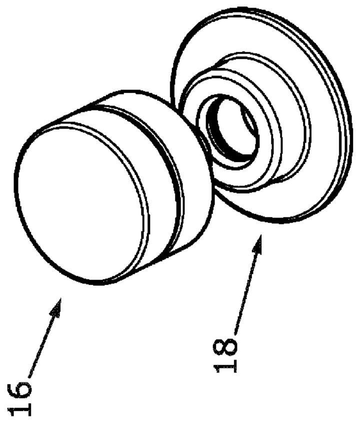
FIG. 2*a* shows an isometric view of a further variant of a control pin and a counter element. The counter element is fastened with a spring ring on the control pin.

FIG. 2*a* shows a variant of a control pin 16 for connection to a counter element 18.

FIG. 2*b* shows that a spring element 22 is arranged on the control pin 16 and the counter element 18 has a lead-in chamfer 24. When the control pin 16 and the counter element 18 are connected, the spring element 22 is compressed by the lead-in chamfer 24 and expands in a groove 26 in order to hold the control pin 16 on the counter element 18 in particular such that it cannot be released in a non-destructive manner.

Figure 3A:
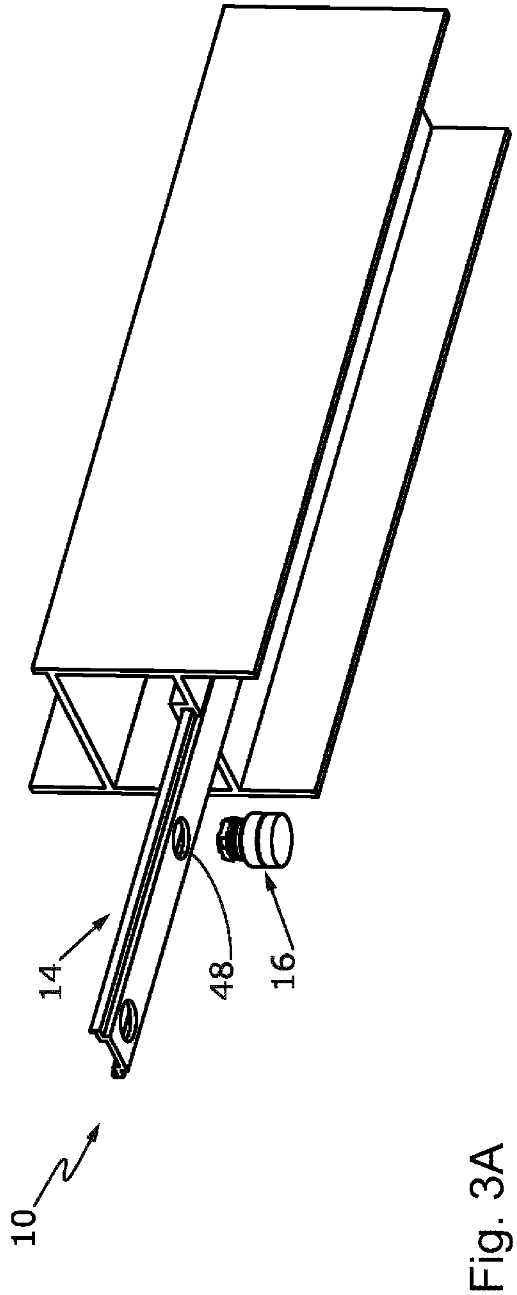
FIG. 3*a* shows an isometric view of a further variant of a fitting arrangement. Fastening of a counter element takes place by widening the counter element and latching in the expanded state.

FIG. 3*a* shows a fitting arrangement 12 with a drive bar 14. A control pin 16 can be passed through a through-hole 48 and attached to the drive bar 14.

Figure 3D:
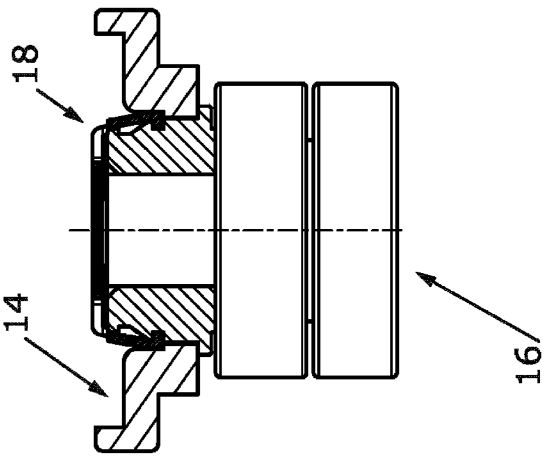
FIG. 3*d* shows a sectional view of the control pin, the counter element and the drive bar of FIG. 3*c* after assembly.
Figure 3C:
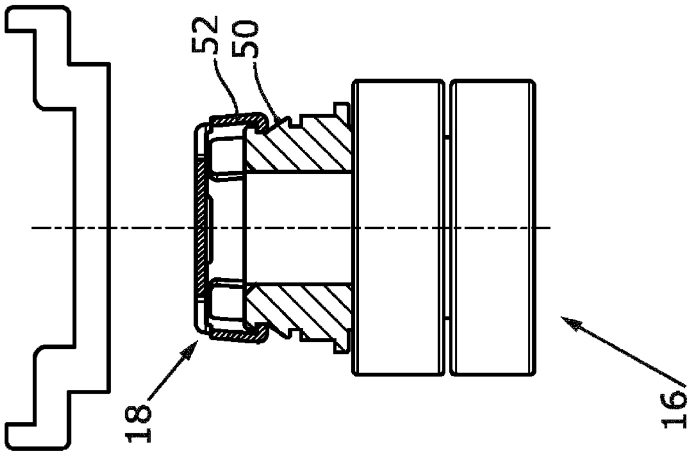
FIG. 3*c* shows a sectional view of a control pin, a counter element and a drive bar of the fitting arrangement of FIG. 3*b* before assembly.
Figure 3B:
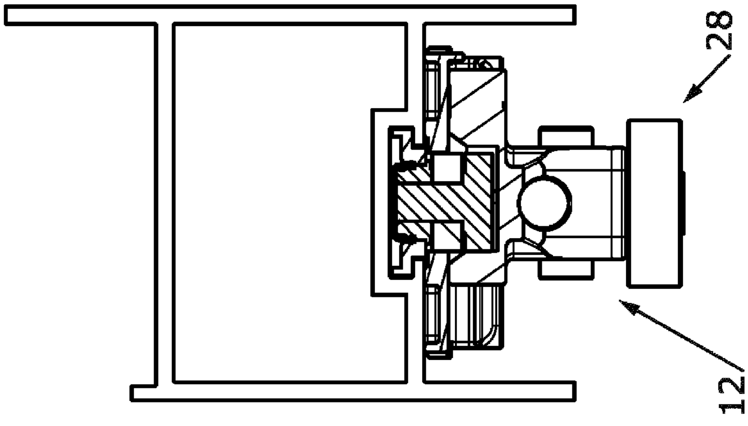
FIG. 3*b* shows a sectional view of the fitting arrangement of FIG. 3*a*.

FIG. 3*b* shows the fitting arrangement 12 in the assembled state with a carriage 28.

FIG. 3*c* shows the control pin 16 and the counter element 18 before assembly. The counter element 18 is designed in the form of a cap. After having been passed through the through-hole 48 and moved in the direction of the longitudinal axis of the control pin 16, the counter element is widened by means of a chamfer 50 and latched by a latching means 52.

FIG. 3*d* shows the control pin 16 latched on the drive bar 14 by the expanded counter element 18.

Figure 4A:
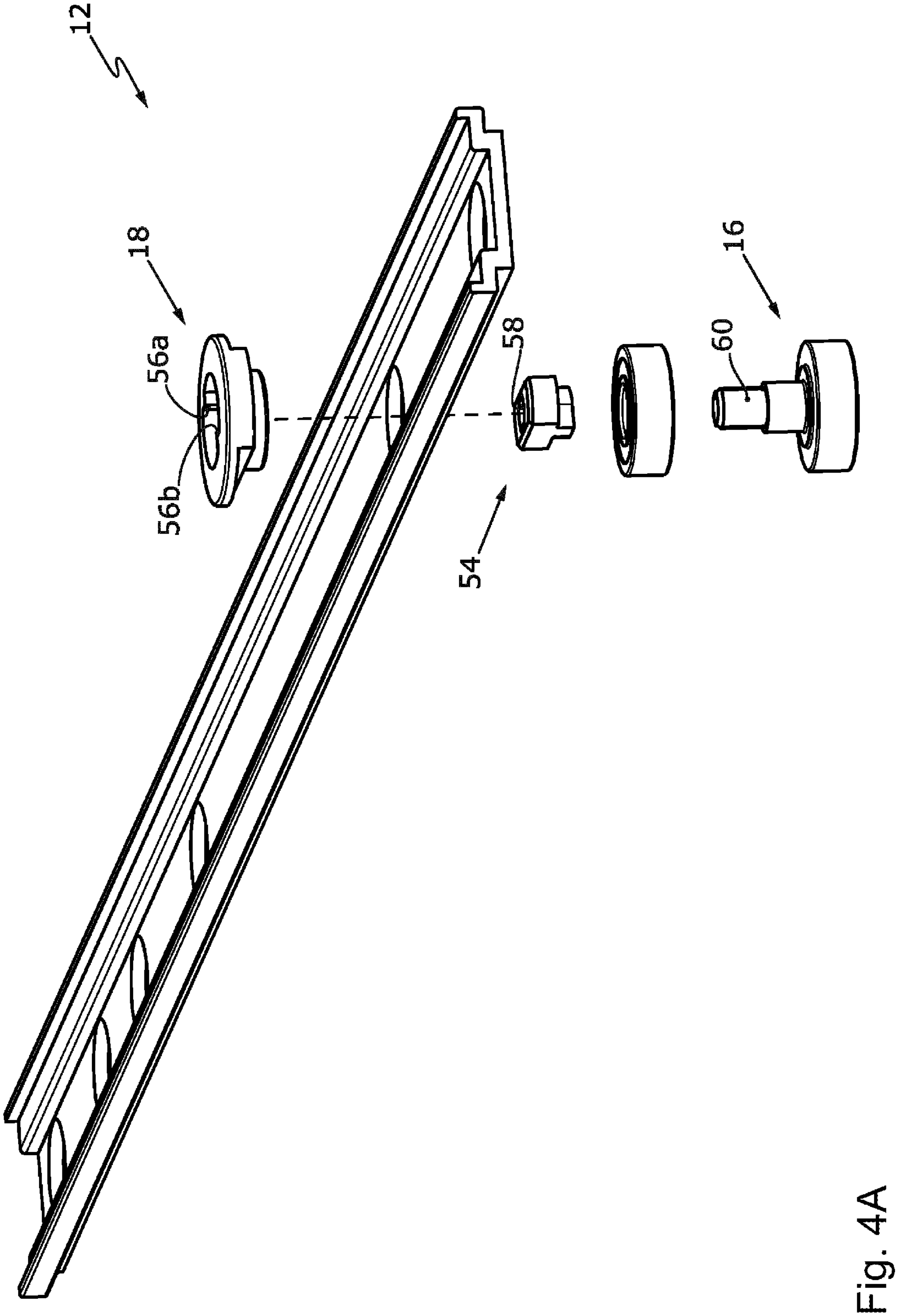
FIG. 4*a* shows an exploded view of a further variant of a fitting arrangement. The counter element is fastened with a slot nut.

FIG. 4*a* shows a fitting arrangement 12 in which a control pin 16 has a slot nut 54. The slot nut 54 can be passed through a counter element 18. The counter element 18 has at least one stop 56*a*, 56*b*. After inserting the slot nut 54 into the counter element 18, the control pin 16 and thus the slot nut 54 can be rotated until the slot nut 54 abuts against at least one of the stops 56*a, b*. The slot nut 54 has a first thread 58 and the control pin 16 has a second thread 60 engaged with the first thread 58. As soon as the slot nut 54 abuts against one of the stops 56*a, b*, a further rotation of the control pin 16 causes axial clamping of the control pin 16 relative to the counter element 18.

Figure 4B:
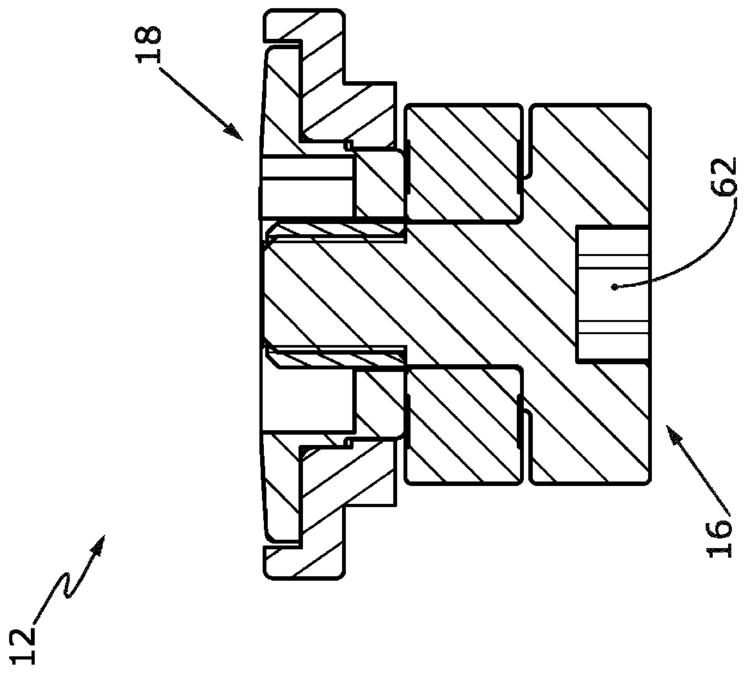
FIG. 4*b* shows a sectional view of the fitting arrangement of FIG. 4*a*.

FIG. 4*b* shows the fitting arrangement 12 with the control pin 16 braced on the counter element 18. The control pin 16 may have a tool application point 62, herein for a polygonal wrench.

Figure 5A:
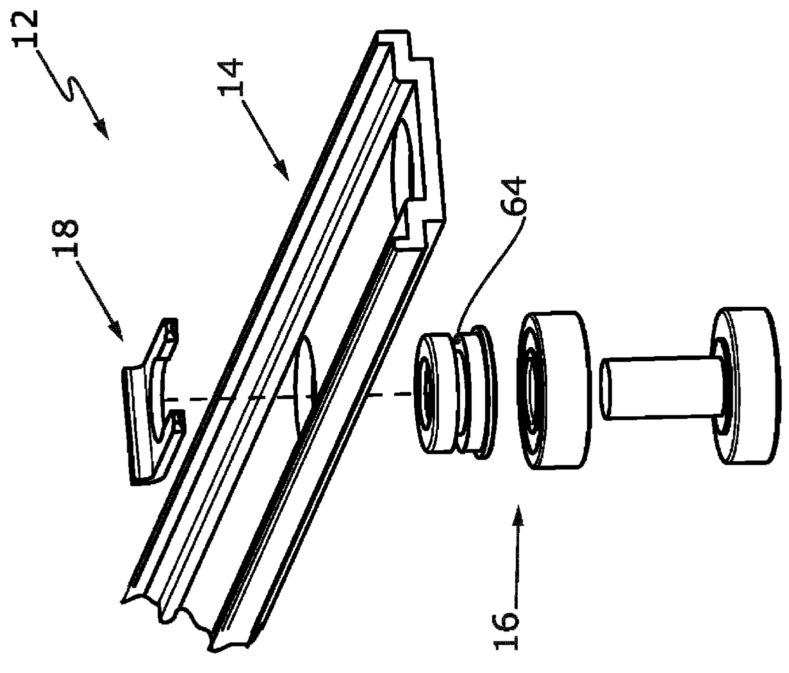
FIG. 5*a* shows an exploded view of a further variant of a fitting arrangement. For fastening a counter element, the counter element can be pushed into a securing groove of a control pin.

FIG. 5*a* shows a further fitting arrangement 12 with a counter element 18 displaceable, in particular, in the longitudinal direction of a drive bar 14. The counter element 18 can be introduced at least partially into a securing groove 64 of the control pin 16. The control pin 16 may be designed to have multiple parts, as shown in FIG. 5*a*.

Figure 5B:
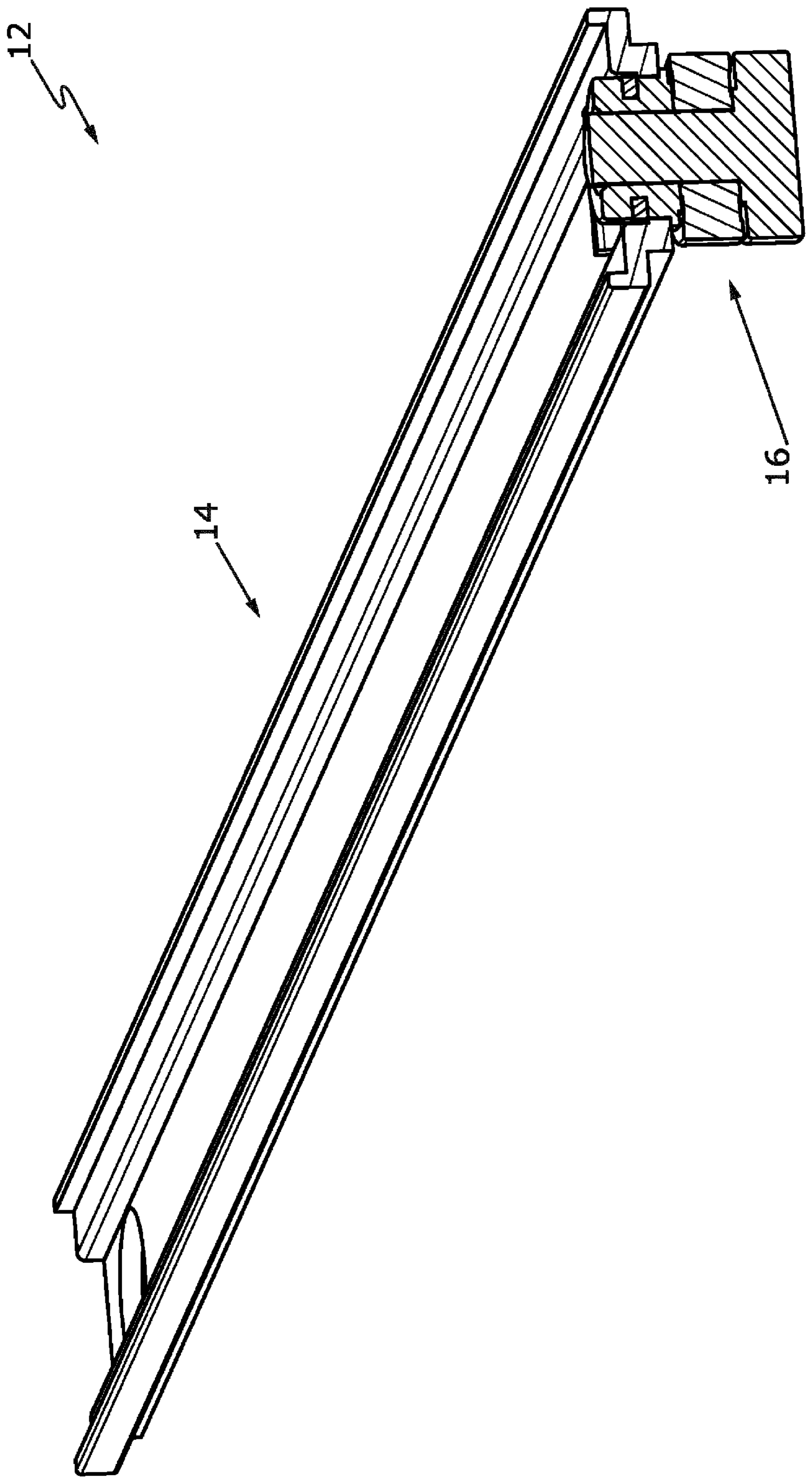
FIG. 5*b* shows a sectional view of the fitting arrangement of FIG. 5*a*.

FIG. 5*b* shows the fitting arrangement 12 with the control pin 16 mounted on the drive bar 14.

Figure 6A:
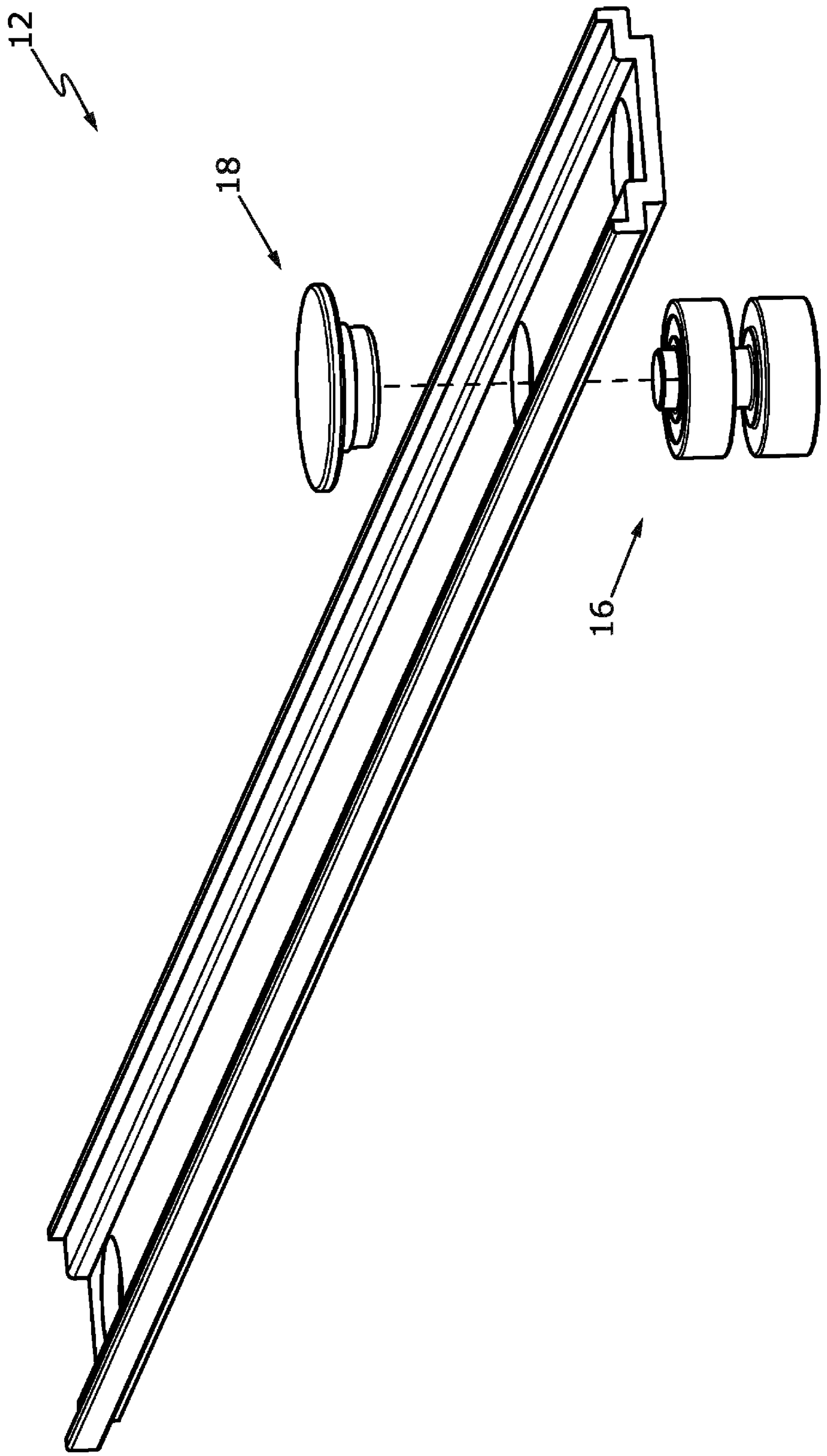
FIG. 6*a* shows an exploded view of a further variant of a fitting arrangement. Fastening of a counter element takes place by means of a press fit.

FIG. 6*a* shows a further fitting arrangement 12 with a counter element 18, which is held on a control pin 16 by a press fit.

Figure 6B:
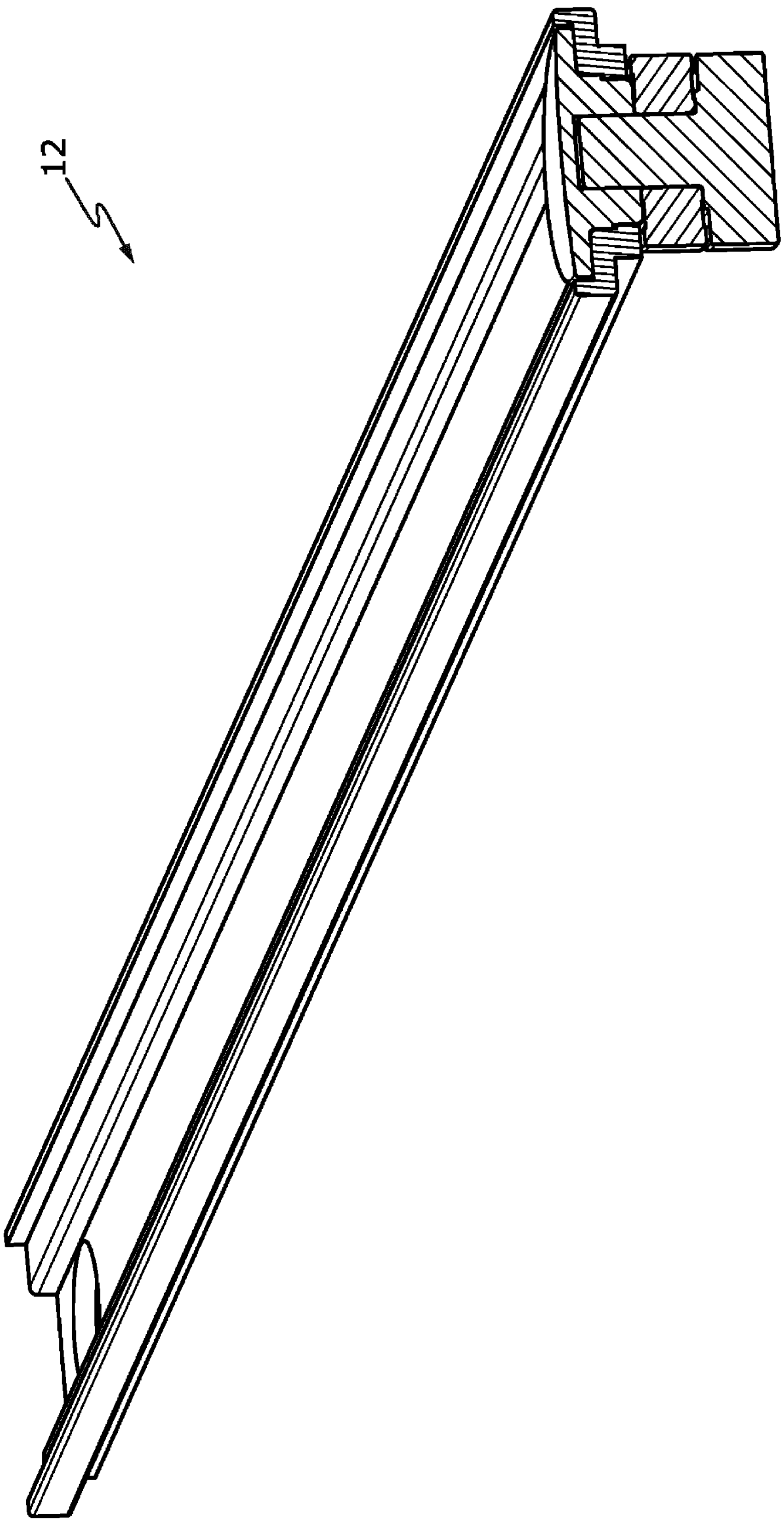
FIG. 6*b* shows a sectional view of the fitting arrangement of FIG. 6*a*.

FIG. 6*b* shows the fitting arrangement 12 in the assembled state.

Figure 7A:
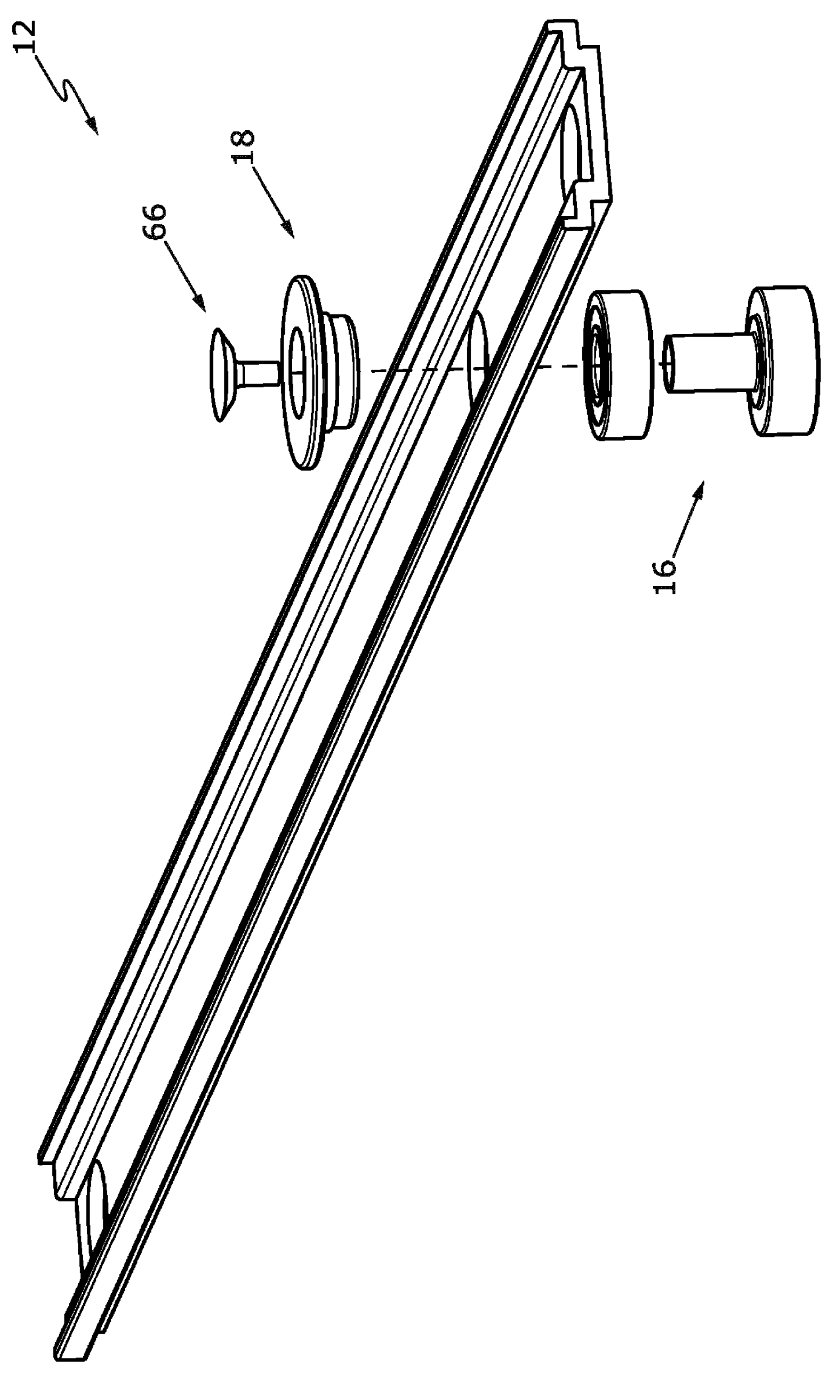
FIG. 7*a* shows an exploded view of a further variant of a fitting arrangement. Fastening of a counter element takes place with a round billet.

FIG. 7*a* shows a further fitting arrangement 12 having a control pin 16, a counter element 18, and a round billet 66.

Figure 7B:
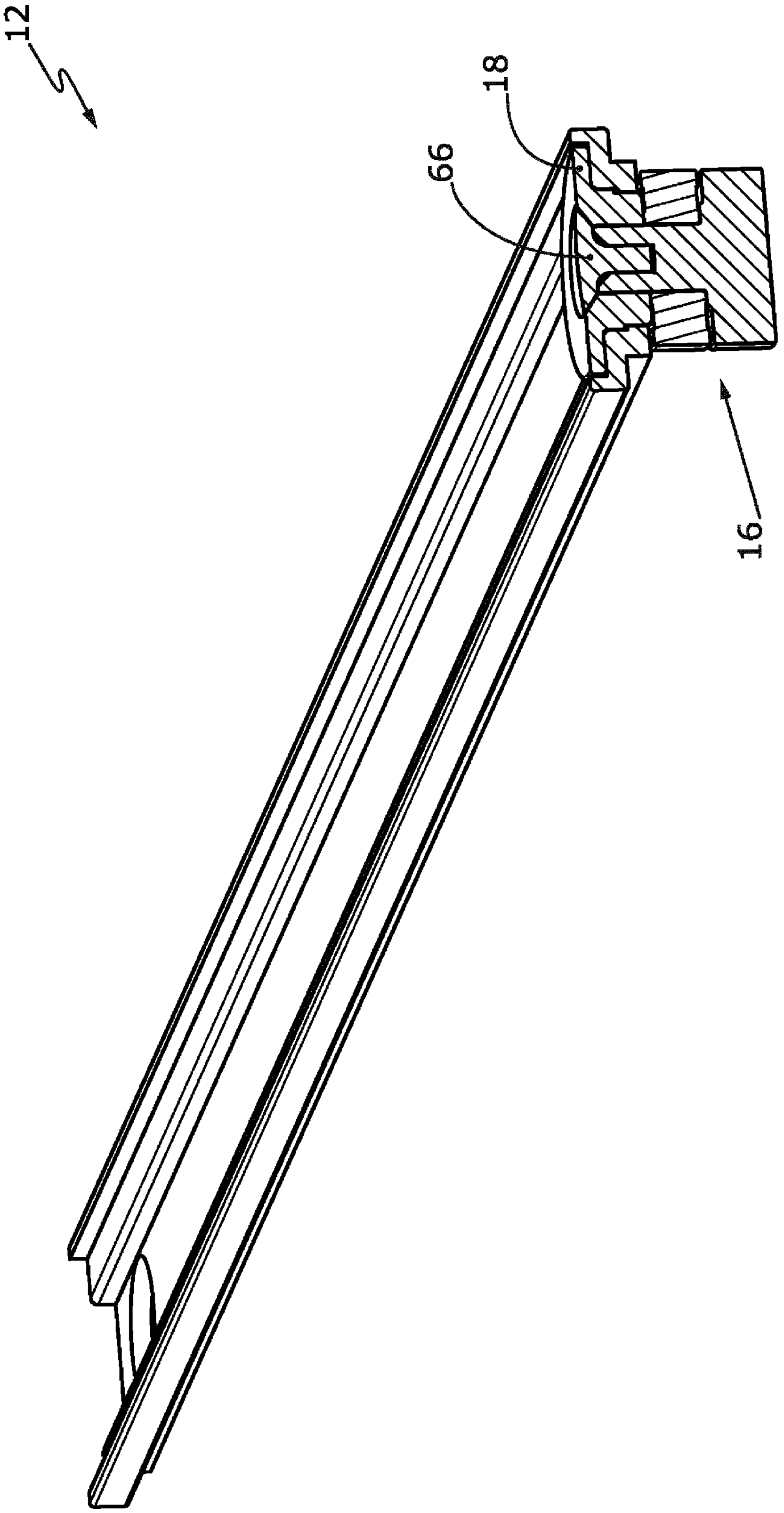
FIG. 7*b* shows a sectional view of the fitting arrangement of FIG. 7*a*.

FIG. 7*b* shows the fitting arrangement 12 in the assembled state. It can be seen from FIG. 7*b* that the round billet 66 is mushroom-shaped. The round billet 66 is fastened to the control pin 16 by a frictional connection and engages behind the counter element 18.

Figure 8A:
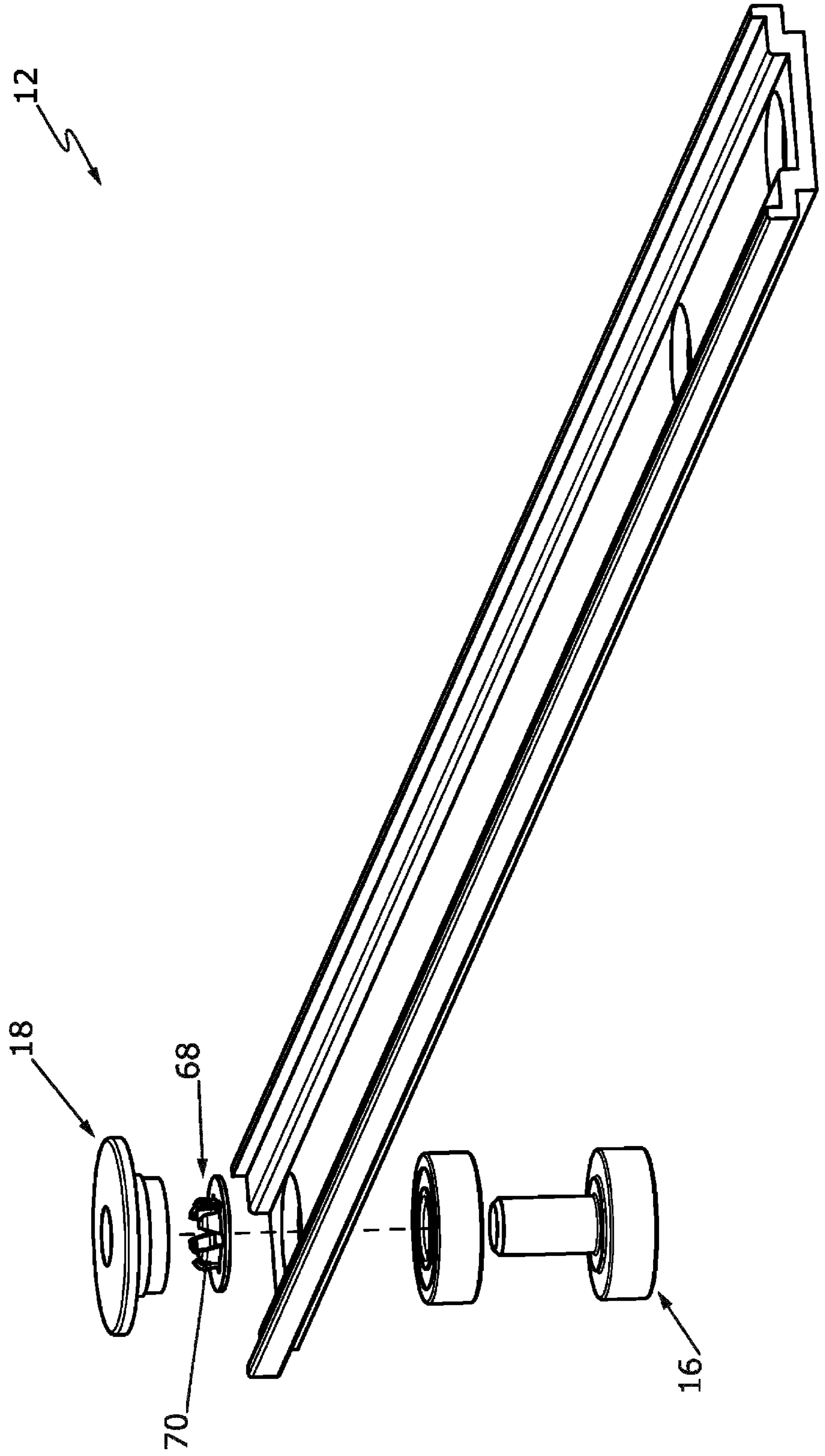
FIG. 8*a* shows an exploded view of a further variant of a fitting arrangement. Fastening of a counter element takes place with a retaining claw.

FIG. 8*a* shows a further fitting arrangement 12, in which a counter element 18 is held on the control pin 16 by means of a lock washer 68. The lock washer 68 has at least one, preferably several, retaining claws, of which—for reasons of clarity—only one retaining claw 70 is provided with a reference sign in FIG. 8*a*.

Figure 8B:
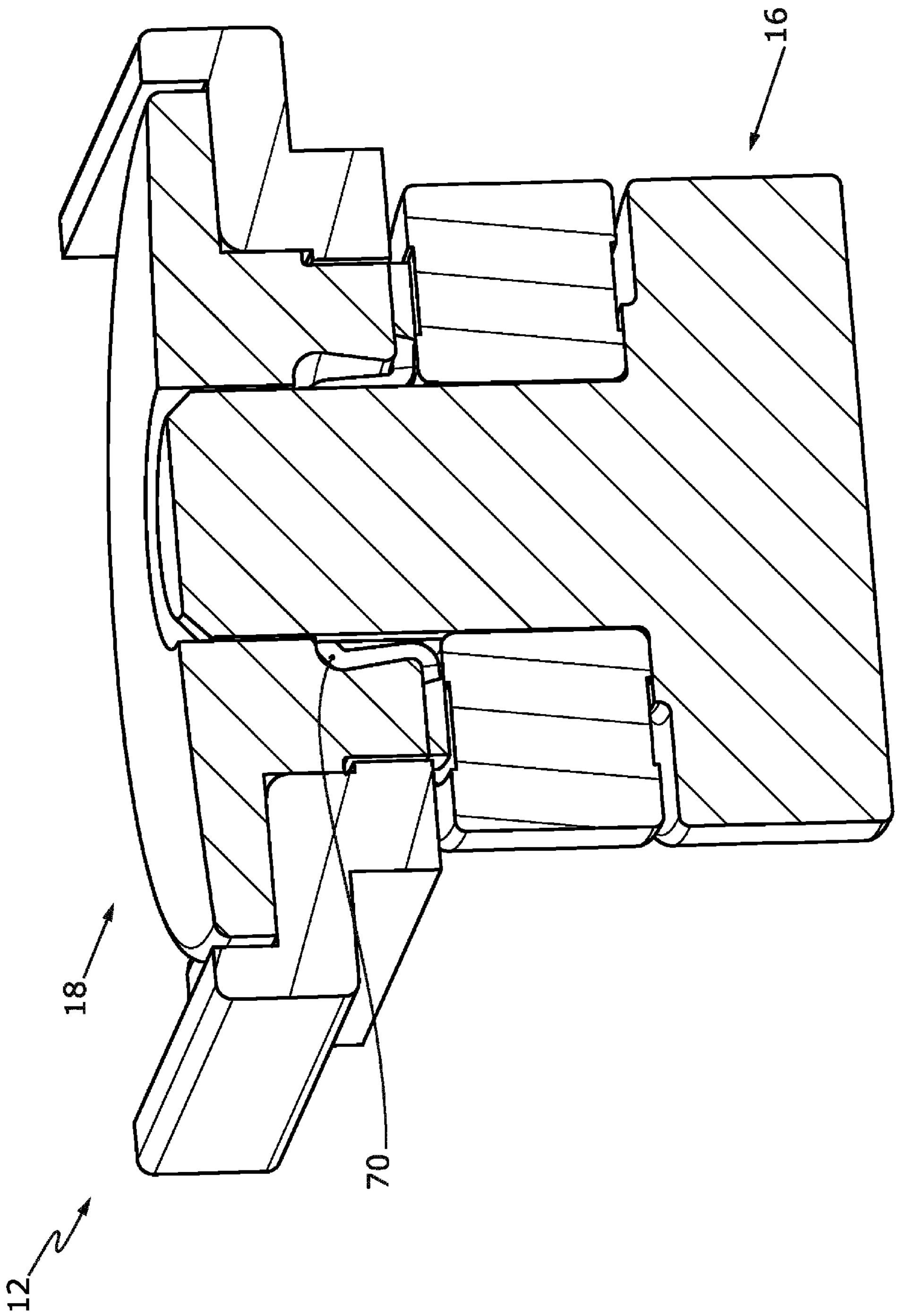
FIG. 8*b* shows a sectional view of the fitting arrangement of FIG. 8*a*.

FIG. 8*b* shows the fitting arrangement 12 in the assembled state. In the sectional view, the connection of the control pin 16 to the counter element 18 by spreading the retaining claw 70 can be seen.

When viewing all the figures of the drawing in combination, the invention relates to a fitting arrangement 12 for a window or a door 10. The fitting arrangement 12 comprises a drive bar 14 with a through-hole 48. A control pin 16 and/or a counter element 18 of the fitting arrangement 12 is/are passed through the through-hole 48 and connected to one another such that the control pin 16 is captively retained on the drive bar 14. The control pin 16 is preferably connected to the counter element 18 without the use of tools. Particularly preferably, a spring element 22 is provided which latches the control pin 16 by pressing the control pin 16 and the counter element 18 axially together. The spring element 22 may be designed in the form of a circlip which, in the not yet assembled state, is arranged on the control pin 16 or the counter element 18.

LIST OF REFERENCE SIGNS

10 Door
12 Fitting arrangement
14 Drive bar
16 Control pin
18 Counter element
20 Guide roller
22 Spring element
24 Lead-in chamfer
26 Groove
28 Carriage
30 Roller part
32 Running roller
34 Fastening part
36 Guide slot
38 Control slot
40 Leaf
42 Running rail
44 Fixed frame
46 Arrow (parking/tightening movement of the carriage 28)
48 Through-hole
50 Chamfer
52 Latching means
54 Slot nut
56*a, b* Stop
58 First thread
60 Second thread
62 Tool application point
64 Securing groove
66 Round billet
68 Lock washer
70 Retaining claw

What is claimed is:

1. A fitting arrangement for a window or a door, comprises:
- a displaceable drive bar with a through-hole;
- a control pin and a counter element arranged on the control pin, wherein the control pin and/or the counter element is passed through the through-hole and the counter element engages behind the drive bar;
- wherein either:
  - a) the counter element is mounted on the control pin without a use of tools;
  - b) the counter element is mounted on the control pin by a frictional engagement; and/or
  - c) the fitting arrangement has a slot nut on the control pin where the slot nut is pivoted in the counter element up to a stop of the counter element and engages behind the counter element;
- wherein the fitting arrangement has a carriage, the carriage comprising:
  - a roller part with a running roller;
  - a fastening part mountable on a leaf of the window or door;
  - a guide slot in the fastening part;
  - a control slot in the roller part that extends at least in sections obliquely to the guide slot;
- wherein the control pin projects into the guide slot and the control slot in order to displace the roller part relative to the fastening part by a movement of the drive bar.

2. The fitting arrangement according to claim 1, wherein the counter element is arranged on the control pin and the counter element cannot be released from the control pin in a non-destructive manner.

3. The fitting arrangement according to claim 1, wherein the counter element is mounted on the control pin in a form-fitting manner.

4. The fitting arrangement according to claim 3, wherein the fitting arrangement has a spring element which is arranged between the control pin and the counter element and in the assembled state engages indirectly or directly with the control pin and the counter element in a form-fitting manner.

5. The fitting arrangement according to claim 4, wherein the control pin and/or the counter element have a lead-in chamfer for widening or pressing-together of the spring element during mounting of the counter element on the control pin.

6. The fitting arrangement according to claim 1, wherein the spring element is designed as a spring ring.

7. The fitting arrangement according to claim 1, wherein the counter element is configured to be passed through the through-hole together with the control pin, wherein the counter element is configured to be widened after passing through in order to engage behind the drive bar in the assembled state.

8. The fitting arrangement according to claim 7, wherein the counter element is designed in the form of a cap where the cap during assembly is radially expandable by an axial movement relative to the control pin.

9. The fitting arrangement according to claim 1, wherein the counter element is displaceable in a longitudinal direction of the drive bar and in the assembled state engages with a securing groove of the control pin.

10. The fitting arrangement according to claim 1, wherein the control pin is held on the counter element by a press fit.

11. The fitting arrangement according to claim 10, wherein a round billet is inserted into the control pin and engages behind the counter element in the assembled state.

12. The fitting arrangement according to claim 1, wherein the control pin and/or the counter element has/have a retaining claw in order to prevent the counter element from being pulled off the control pin.

13. The window or the door comprising a fixed frame and a leaf, wherein the fitting arrangement according to claim 1 is mounted on the leaf.

14. A method for mounting the fitting arrangement of claim 1, comprising the method steps of:
- guiding the control pin through the through-hole of the drive bar;
- securing the control pin by the counter element; and
- including the step of either:

a) mounting the counter element on the control pin without a use of tools;

b) mounting the counter element on the control pin by frictional engagement; and/or c) pivoting the slot nut on the control pin until the slot nut abuts against the stop in the counter element.

15. A fitting arrangement for a window or a door, comprises:

a displaceable drive bar with a through-hole;

a control pin and a counter element arranged on the control pin, wherein the control pin and/or the counter element is passed through the through-hole and the counter element engages behind the drive bar;

wherein either:

a) the counter element is mounted on the control pin without a use of tools; and/or b) the counter element is mounted on the control pin by a frictional engagement, wherein the counter element is configured to be passed through the through-hole together with the control pin, wherein the counter element is configured to be widened after passing through in order to engage behind the drive bar in the assembled state.

16. A fitting arrangement for a window or a door, comprises:

a displaceable drive bar with a through-hole;

a control pin and a counter element arranged on the control pin, wherein the control pin and/or the counter element is passed through the through-hole and the counter element engages behind the drive bar;

wherein either:

a) the counter element is mounted on the control pin without a use of tools; and/or b) the counter element is mounted on the control pin by a frictional engagement, wherein the counter element is displaceable in a longitudinal direction of the drive bar and in the assembled state engages with a securing groove of the control pin.

17. A fitting arrangement for a window or a door, comprises:

a displaceable drive bar with a through-hole;

a control pin and a counter element arranged on the control pin, wherein the control pin and/or the counter element is passed through the through-hole and the counter element engages behind the drive bar;

wherein either:

a) the counter element is mounted on the control pin without a use of tools; and/or b) the counter element is mounted on the control pin by a frictional engagement;

c) wherein the control pin is held on the counter element by a press fit, wherein a round billet is inserted into the control pin and engages behind the counter element in the assembled state.

18. A fitting arrangement for a window or a door, comprises:

a displaceable drive bar with a through-hole;

a control pin and a counter element arranged on the control pin, wherein the control pin and/or the counter element is passed through the through-hole and the counter element engages behind the drive bar;

wherein:

a) the counter element is mounted on the control pin without the use of tools;

b) wherein the counter element is mounted on the control pin in a form-fitting manner;

c) wherein the fitting arrangement has a spring element which is arranged between the control pin and the counter element and in the assembled state engages indirectly or directly with the control pin and the counter element in a form-fitting manner.

* * * * *